United States Patent [19]

Criddle et al.

[11] 3,846,364
[45] Nov. 5, 1974

[54] RESILIENT OIL EXTENDED POLYURETHANE SURFACES

[75] Inventors: Dean W. Criddle, Pleasant Hill; Arthur L. Meader, Jr., Berkeley, both of Calif.

[73] Assignee: Chevron Research Company, San Francisco, Calif.

[22] Filed: Aug. 2, 1972

[21] Appl. No.: 277,459

Related U.S. Application Data

[63] Continuation-in-part of Ser. No. 130,769, April 2, 1971, abandoned.

[52] U.S. Cl. ......... 260/33.6 UB, 161/162, 161/164, 161/190, 161/403, 260/9, 260/37 N, 260/859 R, 260/998.19
[51] Int. Cl. ............................................ C08g 51/28
[58] Field of Search ..... 260/37 N, 33.6 UB, 75 NQ, 260/77.5 AM, 2.3, 9; 94/7, 19

[56] References Cited
UNITED STATES PATENTS

| | | | |
|---|---|---|---|
| 3,136,732 | 6/1964 | Kaestner | 260/37 N |
| 3,272,098 | 9/1966 | Buchholtz | 260/37 N |
| 3,390,119 | 6/1968 | Alexander | 260/37 N |
| 3,450,653 | 6/1969 | McClellan | 260/37 N |
| 3,549,472 | 12/1970 | King | 260/9 |

*Primary Examiner*—Morris Liebman
*Assistant Examiner*—P. R. Michl
*Attorney, Agent, or Firm*—G. F. Magdeburger; C. J. Tonkin; B. G. Fehringer

[57] ABSTRACT

Resilient surfaces are provided which are easy to apply and have excellent tensile and wear properties. A castable mixture is prepared combining a nonvolatile oil-based extender, resilient aggregate, carbon black, and a polyurethane prepared from polyols, the major portion of which is a polypropylene glycol of from about 1,500 to 3,000 molecular weight the minor proportion being a low molecular weight polyol. The resilient surface sets up quickly to a useful surface and will generally be no greater than about 3 inches in depth.

9 Claims, No Drawings

RESILIENT OIL EXTENDED POLYURETHANE SURFACES

CROSS REFERENCE TO RELATED APPLICATIONS

This application is a continuation-in-part of U.S. patent application Ser. No. 130,769, filed Apr. 2, 1971 now abandoned.

BACKGROUND OF THE INVENTION

1. Field of the Invention

Recent years have seen the development of various resilient surfacing materials. These materials have found particular use in indoor and outdoor recreational applications such as for running tracks, athletic fields, golf tees, golf greens, horse stables (stalls), playground surfaces, and tracks for horseracing events.

Ideally, the resilient surfacing materials should have several characteristics. They should be easy to apply, not requiring a great deal of expertise to lay a suitable surface. The ingredients of the surfacing composition should be inexpensive. They should be safe to handle, and surface installation should not require elaborate metering equipment and elaborate mixing equipment at the installation sites.

The compositions should set into a usable surface in a relatively short time, thereby avoiding the effects of inclement weather and proving surfaces usable for athletic events in a short time. They should also be substantially free from shrinkage to void high internal stresses which may cause pulling away from (1) the forms used to contain the poured material, and (2) the base. They should also have sufficient gel properties to resist flow or sag upon casting on the gentle slopes used in athletic and recreational surfaces. Characteristics which are particularly desirable in a finished surface include resilience to reduce muscular fatigue, resistance to wear caused by impact of spikes, horseshoes, etc.; resistance to light and oxidation-induced damage; attractive coloring; sufficient traction for running or walking, etc; the ability to be applied either as a porous or non-porous surface, depending upon the particular application requirements; and the ability to withstand damage caused by freezing and thawing of water in contact with the surface.

A particularly advantageous property for the resilient surfacings is the ability to be applied in drainable, porous form. This imparts significant advantages in construction, dispensing with the very difficult job of providing such accurate leveling as to prevent puddle formation during rains. The finished porous surfaces allow participation in athletic events upon the surfaces during a rain without the difficulties encountered with a water-covered surface.

Also, a properly constructed, non-porous surface should maintain high skid resistance even when the surface is wet.

The resilient compositions of this invention may also find uses as median strips for highways and the like, protective coatings or other indoor and outdoor applications where a resilient mat may be needed.

2. Description of the Prior Art

An elastomeric paving material is disclosed in Buchholtz et al., U.S. Pat. No. 3,272,098, issued Sept. 13, 1966. This material comprises polyurethane binders formed from polyalkylene ether polyols and organic polyisocyanates containing up to 50 percent by volume of a rubbery granular aggregate. The ratio of isocyanate to hydroxy groups is in the range from 0.8:1 to 1.2:1. The incorporation of coarse fillers is not recommended since it makes the material punky and much less tear resistant without reinforcing the tensile strength of the material.

Polyurethane elastomeric sealants are disclosed in McClellan, U.S. Pat. No. 3,450,653, issued June 17, 1969. The ratio of isocyanate groups to hydroxy groups in the urethane-forming components is from 1.01:1.0 to 1.5:1.0 and preferably 1.05:1.0 to 1.2:1.0. The polyurethane sealer can contain from 30 to 50 percent by weight, based on the final sealer, of finely divided fillers such as carbon black, polystyrene, polyvinyl chloride, clays, etc. It is also disclosed that the use of fillers above the stated upper limit of 50 weight percent lessens th tensile strength of the elastomer.

Since these resilient surfaces are, in many cases, used to cover large areas, such as horse race tracks, athletic field tracks, and the like, they should be as inexpensive as possible. However, as shown by the above prior art, it has not been possible to increase the amount of the less expensive components, such as the rubbery aggregate filler, without a loss of tear and/or tensile strength.

Tear strength is particularly important where the surface is to be subjected to sharp objects such as spiked running shoes, horseshoes, etc. At the same time, these uses are of the type which require coverage of large surface areas and therefore the lowest cost per square foot possible.

It has now been found possible to greatly increase (by 50 to 100 percent or more) the tear strength of polyurethane based resilient surfaces by a slight increase (as little as 10 percent) in the isocyanate to hydroxy ratio in the polyurethane forming components. Not only does this allow the preparation of much stronger resilient surfaces for approximately the same cost as the prior art surfaces, it also allows the preparation of resilient surfaces having at least the same tear strength as the prior art surfaces at about one-half the cost. The latter result is obtained by using less (as much as 50 to 60 percent less) of the polyurethane forming components and increasing the amount of resilient aggregate by a corresponding amount.

Furthermore, when the ratio of resilient aggregate is increased and is of a coarser grade, e.g. chunks or noodles, the surface becomes porous in nature, thereby eliminating the need for perfect grading to provide for runoff and prevent puddle formation in rainy weather.

SUMMARY OF THE INVENTION

Accordingly, a resilient surface is provided by casting a mixture containing polyurethane forming compounds, in which the ratio of equivalents of isocyanate groups to equivalents of hydroxy groups is at least 1.3:1, and a resilient aggregate. A premix composition contains (1) a high molecular polypropylene gylcol which contains a minor amount of a low molecular weight polyol, and preferably (2) a drying agent, (3) a catalyst, (4) an extender oil, and (5) carbon black. A polyisocyanate of at least 6 carbon atoms and the resilient aggregate are added to the premix composition. The polyisocyanate, resilient aggregate, and the premix composition are substantially homogeneously mixed and the resulting composition (base mix) is cast onto a surface to provide a rapid-curing, resilient pavement. The surface will normally be from about ⅛ up to about 3 inches in thickness, preferably from about ¼ to 2 inches, and ready for use within about 1 to 2 days, although the final tensile properties may not be reached for a somewhat longer time.

DESCRIPTION OF THE INVENTION

A resilient surface is prepared by (1) mixing together to form a pourable premix composition having a viscosity in the range of 500 to 20,000 centipoises at 77°F. (Brookfield Viscometer, Model RVT, 20 rpm, No. 3 spindle), preferably 1000–10,000 centipoises, (1) a polypropylene glycol having a molecular weight of from about 1500 to about 3000; (2) a minor amount of a low molecular weight polyol, the combination of (1) and (2) hereafter referred to as the polyol component; and preferably (3) an extender oil; (4) carbon black; (5) a drying agent; and (6) usually a catalyst for curing polyurethane; (II) adding to this premix composition under conditions of agitation (7) a resilient aggregate in an amount representing at least 50 weight percent, preferably 55 weight percent and not more than 85 weight percent of the total composition and (8) a polyisocyanate having at least 6 carbon atoms and usually no more than 46 carbon atoms; and (III) casting the resulting base mix onto a surface in a thickness of up to about 3 inches. The pavement may then be worked for a period of time to insure a smooth surface. Normally, all tackiness is gone within a few hours, and the pavement is in usable form within 1 to 2 days. Within 1 to 2 weeks, the surface has substantially achieved its ultimate strength.

While the above method and order of addition of constituents is preferred, the only criticality in the order of addition of constitutents in the combination which is used is that the polyurethane not be preprepared, but be prepared in situ. This means that the diol and polyisocyanate should not be combined, particularly in the presence of catalyst, prior to the final mixing of all the ingredients. However, the resilient aggregate may be incorporated in the premix composition made up of the extender oil, the long chain polyether polyol, the low molecular weight polyol, carbon black, and catalyst; placed in drums and transported to the site where the polyisocyanate is added.

The proportions of the various ingredients in the premix composition may be varied to a significant degree. All parts hereafter are by weight. The amount of (3) extender oil will be from zero, preferably a minimum of about 0.05 part and not more than about 0.3 part per part of the polyol component, more preferably from 0.1 to 0.2 part. The (7) resilient aggregate may vary from about 1.3 parts to about 11 parts per part of polyol component, preferably from about 2.9 to about 10.5 and more preferably from about 4.3 to about 9.0, the (4) carbon black will vary from 0 to about 0.1 part, preferably from 0.02 to 0.08 part and most preferably about 0.05 part per part of polyol component; and the (5) drying agent may be present in an amount of from 0 to 0.1 part, preferably from 0.02 to 0.08 part, most preferably about 0.05 part, per part of polyol component.

The amount of catalyst may vary depending upon the rate of cure of the polyurethane which is desired. Normally, the amount of (6) catalyst will be from about 1.0 to $10^{-4}$ to about $2 \times 10^{-8}$ parts per part of polyol component. The composition made up of (1) through (6) above may be considered a premix composition to which is added the (8) isocyanate and (7) the resilient aggregate at the time the surface is to be formed.

Included with the polypropylene glycol is from 5 to 50 weight percent, based on the total polyol component, of a short chain polyol having 2 to 3 hydroxyl groups, the total amount of polyol remaining as specified above. On a mol basis the ratio of short chain polyol to polypropylene glycol must be in the range of from 0.5–5.1:1 with a preferred range of from 1.0–3:1.

The polyisocyanate is added in a ratio of at least 1.3 equivalents of isocyanate groups to one equivalent of hydroxyl groups available from polyols and more preferably 1.5 equivalents and not more than about 2.3 equivalents per equivalent of hydroxyl. Particularly preferred is an equivalent ratio of 1.6 to 2.1 of isocyanate groups to hydroxyl groups. The parts by weight of polyisocyanate per part of total polyol will be from about 0.3 to 0.8. The use of the higher ratios of isocyanate to hydroxyl groups is especially preferred when the resilient aggregate is present in amounts greater than one part of aggregate per part of polyuretuane, and particularly when the resilient aggregate to polyurethane ratio is 2:1 or greater.

The ratios of materials in the final surface will be related to the premix composition subject to accomodation for the addition of the polyisocyanate. Basing the weight ratio on the combined weight of the polyisocyanate and the polyol component, i.e., on the polyurethane formed, the amount of (1) extender oil will be present in from about zero to about 0.3 parts per part of polyurethane, preferably from about 0.05 to 0.15 part, most preferably from about 0.1 to about 0.13 part. The (7) resilient aggregate will be present in from about 1 to about 6 parts per part of polyurethane, preferably from about 2 to about 5 parts and most preferably as about 3 to 4 parts. The (5) drying agent will be present in an amount of from 0 to about 0.08 part. The (4) carbon black will be present in an amount of from zero to about 0.08 part, preferably in an amount of from about 0.02 to 0.07 part, most preferably about 0.04 part.

In carrying out the method of this invention, it it convenient to first combine the extender oil, polyols, carbon black, catalyst, and the drying agent, if the latter is used, and mix to a homogeneous mass. The drying agent may be included to prevent the accumulation of free water or remove free water which may have been adventitiously introduced. The drying agent will then be present in the finished surface in its hydrated form if water was present. If any water is present the polyisocyanate reacts with it which can cause foaming. Thus the use of a drying agent is often advantageous. The premix composition is sufficiently stable for long periods of time so that it may be stored and shipped as needed. Thus at the work site, a premix composition is provided in a convenient form, which only requires the addition of (8) polyisocyanate and (7) resilient aggregate to provide a castable resilient pavement. The premix composition may then be blended conveniently with the resilient aggregate with a plaster mixer or other mixing means and the polyisocyanate added either neat or as a solution in a hydrocarbon diluent after the resilient aggregate has been added. When substantial homogeneity is achieved, normally within a few minutes, the resulting composition may be dispersed onto the surface to be coated within the confining screed frame by means of a chute or the like. A suitable method for applying the surface is disclosed in U.S. Pat. No. 3,272,098.

Alternatively, the resilient surface may be prepared on a nonadhering base and then laid as a carpet onto the desired undersurface by means of a suitable adhesive or other holding mechanism.

The undersurface may be any of the common paving or undersurfaces for pavements such as asphalt concrete, Portland Cement concrete, macadam, etc. When the undersurface is porous or drains are installed, the entire structure will be porous and allow free drainage of water.

A porous surface is obtained by casting the compositions disclosed herein. The surface becomes progressively more porous as the relative amount of resilient aggregate increases. The top surface can be rendered non-porous, if desired, by coating the surface with various paints as hereafter described. The amount of coating applied will determine if the surface remains porous or not.

When the surface formed using the subject invention is porous, is laid on a porous sub-base, and is combined with a grass-type carpet, a playing field is formed with the aesthetic and functional characteristics of the prior art surfaces but with the added advantage of porosity and maintenance of a dry playing field.

COMPONENTS

Polyols

The polyol is primarily polypropylene glycol of from about 1,500 to about 3,000 average molecular weight, although there may be minor amounts of higher order polyols present. Mixtures of polypropylene glycols within the above range are also contemplated as part of this invention. A preferred polypropylene glycol has a molecular weight of about 2,000. The preferred glycol has good viscosity properties and the polyurethane formed therefrom remains flexible even at low temperatures.

The low molecular weight polyols, normally di- or triols, will have from about 2 to 12 atoms separating the most distant hydroxyl groups and will be of from about 2 to 18 carbon atoms and will have molecular weights in the range of 62 to 300. The atoms intermediate of the hydroxyl groups, besides carbon, may be oxygen, nitrogen, or sulfur and may form ethers, amino groups, etc. These polyols will normally have from 0 to 4 hetero atoms. They may contain aromatic moieties.

Examples of low molecular weight polyols useful in the invention include 3-methyl-1,5-pentanediol, 3-dimethylamino-1,2-propanediol, trimethylopropane, glycerine, 1,4-butanediol, ethylene glycol, diethanolamine, triethanolamine, diethylene glycol, 1,4-cyclohexane dimethanol, N,N,N',N'-tetrabis(2-hydroxypropyl(ethylene diamine and N,N-bis-(2-hydroxypropyl) aniline of which the last is preferred.

Resilient Aggregate

The resilient aggregate which is employed can be derived from either natural or synthetic rubbers as well as other resilient material. Rubber particles are available commercially as rubber buffings, as grinding from discarded tires, as polyurethane granules, etc. Other resilient material which may be employed is illustrated by cork particles and sponge-rubber particles. The particular shape of the particles is not critical. However, the longest dimension should be no more than about 1 inch, more usually from about 0.4 inch to 0.7 inch. Usually, the resilient aggregate will pass through a No. 3 U.S. standard sieve and not through a No. 30 U.S. standard sieve. Preferred resilient aggregates have particles which predominantly approximate the average size. However, a small percentage of up to about 10 percent by weight of fine particles may be present without deleterious effects, i.e. loss of tensile and/or tear strength.

Extender Oil

A wide variety of extender oils are suitable in the subject invention. The viscosity should be in the range of from about 100 to 10,000 SUS at 100°F, preferably for better strength and handling characteristics at low temperatures, in the range of 500 to 5,000. The oil, to be suitable for use in the system, should not bleed or exude after laydown and should have a relatively low viscosity to allow filler loading. The oil must also be miscible with the polyol component and the other premix composition constituents. Since the oils having a substantial aromatic component are more miscible with the polyol component, oils having an aniline point of from about 75° to about 140°F are preferred.

A particularly preferred extender oil is the extract from a sidecut in the manufacture of lube oils wherein phenol is used to extract aromatics where the resulting extract has a viscosity of 2,100 SUS at 100°F, and an aniline point of 100°F.

The use of extender oils is preferred when the resilient surface contains a high ratio of resilient aggregate, e.g., about 2 parts or more per part of polyurethane. The extender oil imparts better flexibility and better handling properties during mixing and casting. In addition, it improves adhesion of the polyurethane to the resilient aggregate resulting in greater tear and tensile strength.

Polyisocyanates

The polyisocyanates will generally be diisocyanate or mixtures of diisocyanate with higher order polyisocyanates, normally not exceeding 5 isocyanate groups. Usually, in mixtures of di- and higher order polyisocyanates, the higher order polyisocyanates will be present in not more than 50 equivalent percent, usually not more than about 20 equivalent percent. Preferably, diisocyanates are used. As already indicated, the higher order polyisocyanates (greater than di-) have at least 12 carbon atoms and usually do not exceed 46 carbon atoms, the diisocyanages generally varying from about 6 to 24 carbon atoms.

Illustrative polyisocyanates are diphenyldiisocyanate, bis(isocyanatophenyl)methane, 1,5-naphthalenediisocyanate, polyphenyl polymethyleneisocyanate (PAPI, supplied by Upjohn Co.), toluene diisocyanate, hexamethylene diisocyanate, dodecamethylene diisocyanate, 1,4-diisocyanatocyclohexane, etc. A particularly preferred polyisocyanate is poly(methylene phenylene polyisocyanate).

As already indicated, the polyisocyanates may be added to the premix composition either neat or in solution. When in solution, the polyisocyanates will generally be in a concentration of from about 30 to 80 weight percent.

Catalysts

Various catalysts may be used which are common for the curing of polyurethanes. These include dibutyl tin dilaurate, diazabicycloctane, stannous octoate, etc. The dibutyl tin dilaurate is preferred.

Carbon Black

Carbon black having a mean particle diameter of from about 10 to about 70 millimicrons is suitable for use in the subject invention. The carbon black increases the hardness, tensile and tear strength, elongation capability and weather resistance. Particularly preferred carbon blacks are those with a mean particle diameter of from about 20 to about 55 millimicrons.

The dispersion of the carbon black in the system is difficult due to its fine particle size and nature. Preferably, it is introduced into the polyol prior to formation of the premix composition by circulating the polyol and carbon black through a high shear pump or colloid mill.

Drying Agent

Other materials may also be added for specific purposes. Advantageously, a drying agent is used to minimize the amount of water present when the polyol and polyisocyanate are combined. Illustrative drying agents include calcium oxide, calcium chloride, potassium carbonate, magnesium sulfate, calcium sulfate, etc.

The surface may be coated, once formed, using any coating which has sufficient strength and resilience to withstand spiked traffic and the like. For improved flame resistance and aesthetics coating is desirable. Solvent-based paints having, for example, an acrylic cutback binder can be employed, as well as latex-based paints, vinyl acrylics, etc. Conveniently, a light thinner is used as the diluent when solvent-based paints are used. Various pigments may also be used to impart any desired color. Chromium oxide may be used when a green color is desired. Rubber aggregate can be sprinkled on the surface, becoming partially embedded in the polyurethane before curing, and can then be painted to give a textured grass-like appearance.

Alternately, the premix composition to which has been added the isocyanate may be spread on any suitable substrate by spraying or squeezing a thin layer about 1/16 to 1/8 inch thick, and rubber aggregate can be sprinkled on the surface for texturing.

Rubber aggregate sprinkled on the surface is used primarily for aesthetic purposes, providing a pleasant appearance and comfortable feeling underfoot. It also provides a good base for painting. Texturing, however, is not essential for skid resistance, the untextured surface having excellent traction, even when wet.

When spread in a thin layer as described above, other aggregates may be sprinkled into the surface, such as sand, rock chips, ground walnut shells, etc., to provide a sandpaper or rough surface texture, for walkways, garage decks, etc.

A fabric-type structure may also be adhered to the surface to give a grassy appearance while maintaining resilience of the structure.

A number of compositions were prepared and tested for their physical properties. The following examples are offered by way of illustration and not by way of limitation. All parts are by weight, unless otherwise specified.

EXAMPLE 1

A premix was prepared with 12.4 percent oil, 65.9 percent polypropylene glycol (molecular weight of 2,025), 13.9 percent N,N-bis(2-hydroxypropyl)aniline, 3.9 percent carbon black (Statex F-12, beaded form having a mean particle diameter of 29 millimicrons, product of Columbian Carbon Co), 3.9 percent calcium oxide, and 0.035 percent dibutyl tin dilaurate. This premix was milled one pass through a Manton-Gaulin mill to disperse the carbon. To 100 parts of this premix was added 50 parts of bis(isocyanateophenyl)methane and 500 parts of rubber buffings from waste tires with mixing to form the base mix. The base mix was leveled, hand compacted, and allowed to cure 16 hours at 160°F. The resultant material had a tensile strength of 57 psi, a tear strength of 18 lb/in, and an elongation at break of 175 percent.

EXAMPLE 2

This example shows the effect of varying the amount of oil and resilient aggregate used in the system.

A premix composition was prepared by combining 13.88 parts of N,N-bis(2-hydroxypropyl)aniline, 65.87 parts of polypropylene glycol (molecular weight of 2,025), 3.93 parts of calcium oxide, 3.93 parts of Statex F-12, beaded form, and 0.035 part of dibutyl tin dilaurate. This premix was milled by passing it through a gear pump three times.

To 100 parts of this premix was added a varying amount, as specified in Table 1, of an oil having a viscosity of 2,100 SUS at 100°F and sufficient bis-(isocyanatophenyl)methane to give the N=C=O to —OH (from the N,N-bis(2-hydroxypropyl)aniline and glycol) ratio specified in Table 1. Sufficient resilient aggregate (rubber particles from waste tires) to constitute the percent by weight of the entire mixture not counting the oil, as indicated in Table 1 was added. That is, the resilient aggregate constitutes the percent by weight of the finished surface indicated if the amount of oil present is not considered.

The surfaces prepared using the premix described above and varying quantities of the isocyanate and oil were uniformly compacted with a force of 1,044 grams per 28 in² and cured for 16 hours at 160°F. The surfaces had the properties shown in Table 1 below.

The resilient aggregate used was of two types. Type G was of the granular type described above under resilient aggregate. Type P was powdered rubber from waste tires, all of which would pass a No. 30 U.S. standard sieve.

TABLE 1

| % wt. of Resilient Aggregate | Type of Resilient Aggregate | % by wt. of oil added based on wt. of premix | NCO/OH Ratio | Tensile Strength psi | Tear Strength (lb/in) | Compressive Hardness (psi for 25% strain) |
|---|---|---|---|---|---|---|
| 78.4 | G | 0 | 1.86 | 35 | 11.5 | 16.5 |
| 78.4 | G | 4 | 1.86 | 38 | 14.5 | 20.5 |
| 78.4 | G | 8 | 1.86 | 44 | 13 | 24.5 |
| 78.4 | G | 10 | 1.86 | 47 | 14.5 | 17.5 |
| 78.4 | G | 12 | 1.86 | 50 | 16 | 21 |
| 78.4 | G | 14 | 1.86 | 53 | 16.5 | 24.5 |
| 78.4 | G | 20 | 1.86 | 54 | 24.5 | 24.5 |

TABLE 1 —Continued

| % wt. of Resilient Aggregate | Type of Resilient Aggregate | % by wt. of oil added based on wt. of premix | NCO/OH Ratio | Tensile Strength psi | Tear Strength (lb/in) | Compressive Hardness (psi for 25% strain) |
| --- | --- | --- | --- | --- | --- | --- |
| 78.4 | G | 0 | 1.50 | 34 | 11.5 | |
| 78.4 | G | 3.8 | 1.50 | 29 | 11.5 | |
| 78.4 | G | 7.4 | 1.50 | 36 | 11.5 | |
| 78.4 | G | 8.2 | 1.50 | 38 | 13.5 | |
| 78.4 | G | 11.2 | 1.50 | 29 | 14.5 | |
| 78.4 | G | 13 | 1.50 | 26.5 | 12.5 | |
| 78.4 | G | 15 | 1.50 | 33 | 13.5 | |
| 78.4 | G | 18.6 | 1.50 | 38 | 13.5 | |
| 78.4 | G | 0 | 1.3 | 19 | 7 | |
| 78.4 | G | 3.5 | 1.3 | 19 | 6 | |
| 78.4 | G | 7.2 | 1.3 | 30 | 7 | |
| 78.4 | G | 8.9 | 1.3 | 19 | 7 | |
| 77 | G | 12 | 1.2 | 10.8 | 3.1 | |
| 50 | G | 12 | 1.86 | 64.3 | 19.6 | |
| 50 | G | 12 | 1.5 | 52.0 | 17.1 | |
| 50 | G | 12 | 1.3 | 39.8 | 15.8 | |
| 50 | G | 12 | 1.2 | 44.7 | 15.2 | |
| 50 | P | 12 | 1.2 | 138.7 | 20.0 | |
| 77 | P | 12 | 1.2 | 2.3 | 0.0 | |

The resilient surface prepared containing 50 percent powdered rubber foamed moderately after the isocyanate was added. The gas results from the reaction of the isocyanate with moisture present in the hygroscopic premix and absorbed by the rubber. With the surfacing composition being 50 percent binder materials, nearly all the voids are filled and the mixture is non-permeable to the gas formed. Therefore the gas cannot escape and causes foaming. This foaming can cause problems in large scale applications where water may be present in larger amounts. It also leads to surfaces which have wide variations in properties. Furthermore, if foaming is not constant throughout a large area, an uneven surface will result.

In the resilient surface containing 77 percent powdered rubber, the rubber has so much surface area that the binder cannot properly wet the aggregate. The mixture thus lacked good internal cohesion and the cured surfacing composition was a dry crumbly mass.

As can be seen from the results in Table 1, resilient surfaces containing more than 78 weight percent granular resilient aggregate have greater tensile and tear strengths at an isocyanate to hydroxyl ratio of 1.86 than do resilient surfaces containing more than twice as much binder (i.e. 50 percent aggregate) at a ratio of 1.2. Thus, surfaces at least as strong can be prepared for approximately one half the cost. Also, the strengths of the surfacing material double at the 77 percent aggregate level when the NCO/OH ratio is increased from 1.2 to only 1.3.

Furthermore, when resilient aggregate of the granular type is used, the surfacing material contains void spaces, allowing the escape of any gas formed and eliminating the foaming problem.

EXAMPLE 3

This example shows the effect of varying the mol ratio of polypropylene glycol to low molecular weight polyol.

Premix compositions were prepared having the makeups set forth in Table 2 below.

TABLE 2

| | Parts by Weight | | | |
| --- | --- | --- | --- | --- |
| N,N-bis(2-hydroxypropyl)aniline | 8.6 | 15.7 | 21.6 | 27.0 |
| Polypropylene glycol (molecular weight of 2,025) | 81.4 | 74.3 | 68.4 | 63.0 |
| Calcium Oxide | 5.0 | 5.0 | 5.0 | 5.0 |
| Carbon Black (Statex F-12, beaded form) | 5.0 | 5.0 | 5.0 | 5.0 |
| Dibutyl Tin Dilaurate | 0.035 | 0.035 | 0.035 | 0.035 |
| Mol Ratio of N,N-bis(2-hydroxypropyl)aniline to polypropylene glycol | 1:1 | 2:1 | 3:1 | 4:1 |

The premixes were milled by passing them through a gear pump three times.

To the premixes were added 10 percent by weight (based on the combined weight of the premix and the isocyanate) of an oil having a viscosity of 2,100 SUS at 100°F. After addition of the oil, varying amounts of bis-(isocyanatophenyl)methane were added to the premix to give the N=C=O to —OH ratios shown in Table 3. Immediately following the addition of the isocyanate, sufficient resilient aggregate (rubber particles from waste tires) was added to constitute 76.8 percent by weight of the total composition.

The mixtures were then spread to form surfaces and uniformly compacted with a force of 37.5 pounds per square inch. The surfaces were cured for 16 hours at 160°F. The surfaces had the properties set forth in Table 3.

TABLE 3

| Mol Ratio of N,N-bis(isocyanatophenyl) methane to polypropylene glycol | NCO/OH Ratio | Tensile Strength psi | Tear Strength lb/inch | Compressive Hardness psi | Penetration Softness Values[1] (1/10 inch) |
|---|---|---|---|---|---|
| 1 | 2.1  | 49.5 | 16.8 | 13   | 2.0 |
| 1 | 1.86 | 37   | 14.2 | 13   | 2.0 |
| 1 | 1.7  | 34   | 12.4 | 8.5  | 2.6 |
| 1 | 1.5  | 20.5 | 7.2  | 6.5  | 2.6 |
| 1 | 1.3  | 9    | 3.8  | 4.5  | 3.0 |
| 2 | 2.1  | 83   | 30.2 | 25.5 | 1.5 |
| 2 | 1.86 | 79   | 26   | 20   | 1.5 |
| 2 | 1.7  | 68   | 21.2 | 17.5 | 1.5 |
| 2 | 1.5  | 48.5 | 18.2 | 12.5 | 2.0 |
| 2 | 1.3  | 15.5 | 5.2  | 7.5  | 2.5 |
| 3 | 2.1  | 56.5 | 19.2 | 48.5 | 0.6 |
| 3 | 1.86 | 66   | 20.8 | 29   | 1.0 |
| 3 | 1.7  | 48.5 | 13.2 | 21   | 1.2 |
| 3 | 1.5  | 31.5 | 12.6 | 18.5 | 1.6 |
| 3 | 1.3  | 34.5 | 6.2  | 15.5 | 2.2 |
| 4 | 1.86 | 69   | 18.6 | 19.5 | 0.7 |
| 4 | 1.7  | 61   | 19.4 | 17.5 | 0.6 |
| 4 | 1.5  | 51   | 17.2 | 12.5 | 1.0 |
| 4 | 1.3  | 39.5 | 12.4 | 11   | 1.0 |

[1]The deformation in tenths of an inch of a resilient surface, when 38 psi is applied to a ¾-inch diameter disc, is called the Penetration Softness Value. The stress is conveniently applied with a Concrete Penetrometer (CT-421, made by Soiltest, Inc.) onto a ¾-inch diameter metal disc such that the penetrometer registers 340 psi.

It is evident from the aforesaid results that the compositions of this invention are useful in preparing resilient pavements which have good tensile properties and which cure rapidly at ambient temperatures to a useful surface. The resilient surfaces have good tear strength and nonskid qualities. Furthermore, it is found that the pavements are not slippery even when wet.

Where injury occurs to the surface, the surface is readily repaired without leaving any discontinuity in the surface. The pavements are found to have a good temperature profile in not becoming brittle at 10°F or too soft at 140°F. Furthermore, the compositions substantially maintain the good tensile properties across the temperature range indicated above, subject to some decrease at high temperature while maintaining resiliency.

The compositions can be used for other uses than recreational surfaces, such as accoustical tile or sheeting, insulation, non-woven rugs, protective sheeting, mechanical shock absorbers, etc. The products proposed by the invention are attractive; form good bonds with paint; are durable; easily prepared with available equipment without significant hazard to the operators; readily bond to a variety of surfaces, e.g., aggregate, concrete, wood, etc.; and are not significantly sensitive to weather conditions. While the surfaces will normally be used in a thickness of from ⅛ to 2 inches, coatings as thin as 1/16 inch may be obtained for texturing purposes on median strips and the like by spraying the base mix onto the surface to be coated.

It is apparent that different embodiments may be made without departing from the scope and spirit thereof; and, therefore, it is not intended to be limited, except as indicated in the appended claims.

We claim:

1. A resilient surfacing of from about ⅛ to 3 inches in thickness, comprising (1) 1 part by weight of a polyurethane prepared in situ from a polyisocyanate and a polyol mixture, wherein said polyol mixture is from 50–95 weight percent of a polypropylene glycol having a molecular weight of from 1,500 to about 3,000 and from 50–5 weight percent of a short-chain polyol having 2 to 3 hydroxyl groups and a molecular weight in the range of from 62–300, the mol ratio of said short-chain polyol to said polypropylene glycol being from 0.5–5.0:1.0, and wherein said polyisocyanate is used in an equivalent ratio of from about 1.3 to about 2.3 equivalents per equivalent of hydroxyl from said polyol mixture, (2) from 0.05 part to about 0.3 part by weight extender oil having a viscosity of from 100 to 10,000 SUS at 100°F., and an aniline point of from 80 to 140, (3) from about 2 to about 5 parts by weight natural or synthetic rubber particles having a maximum dimension of about 1 inch, not more than ten percent of which will pass through a No. 30 U.S. standard sieve, (4) from zero to about 0.08 part by weight drying agent, and (5) from zero to about 0.08 part by weight carbon black having a mean particle diameter of from about 10 to about 70 millimicrons.

2. The surface of claim 1 wherein said thickness is from about ¼ to 2 inches.

3. The surface of claim 1 wherein said carbon black is present in an amount of from 0.02 to 0.07 part by weight.

4. The surface of claim 1 wherein said polyisocyanate is used in an equivalent ratio of from 1.5 to 1.9 isocyanate groups to 1 hydroxyl group and said polyisocyanate is at least 50 equivalent percent diisocyanate.

5. The surface of claim 1 wherein the mol ratio of said short-chain polyol to said polypropylene glycol is from 1.0–3.0:1.0.

6. The surface of claim 1 wherein said short-chain polyol is N,N-bis(2-hydroxypropyl)aniline and said polypropylene glycol has a molecular weight of about 2,000.

7. The surface of claim 6 wherein said natural or synthetic rubber particles are present in an amount of from 3 to about 4 parts by weight.

8. The surface of claim 7 wherein the mol ratio of said short-chain polyol to polypropylene glycol is in the range of from 1.0–3.0:1.

9. The surface of claim 8 wherein said carbon black is present in an amount of about 0.05 part, said drying agent is calcium oxide present in an amount of about 0.05 part, said polyisocyanate is bis-(isocyanatophenyl) methane, used in an equivalent ratio of from 1.3 to 1.9 equivalents of isocyanate groups per equivalent of hydroxyl groups, and said extender oil is present in an amount of about 0.1 part and has a viscosity of about 2,100 SUS at 100°F and an aniline point of 100°F.

* * * * *